(12) United States Patent
Eom

(10) Patent No.: US 9,570,035 B2
(45) Date of Patent: Feb. 14, 2017

(54) DISPLAY DEVICE

(71) Applicant: SAMSUNG DISPLAY CO., LTD., Yongin, Gyeonggi-Do (KR)

(72) Inventor: Ki-Myeong Eom, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 11 days.

(21) Appl. No.: 14/341,682

(22) Filed: Jul. 25, 2014

(65) Prior Publication Data
US 2015/0243242 A1   Aug. 27, 2015

(30) Foreign Application Priority Data

Feb. 25, 2014 (KR) .................. 10-2014-0022072

(51) Int. Cl.
| | |
|---|---|
| *G09G 3/00* | (2006.01) |
| *G09G 5/00* | (2006.01) |
| *G09G 3/20* | (2006.01) |
| *G02F 1/1362* | (2006.01) |

(52) U.S. Cl.
CPC ........... *G09G 5/00* (2013.01); *G02F 1/136286* (2013.01); *G09G 3/20* (2013.01);
(Continued)

(58) Field of Classification Search
CPC .. G09G 3/006; G09G 3/3208; G09G 2330/12; G09G 2300/0426; G09G 2300/0842; G09G 3/3233; G09G 3/3648; G09G 2300/0408; G09G 2300/0861; G09G 2310/0297; G09G 2330/04; H01L 2251/566; H01L 27/3244; H01L 27/3276; H01L 51/56; H01L 2924/0002; H01L 27/3246; G01R 31/318544
(Continued)

(56) References Cited

U.S. PATENT DOCUMENTS

| | | | | |
|---|---|---|---|---|
| 7,429,970 B2 * | 9/2008 | Tsai | ...................... | G09G 3/006 324/760.01 |
| 2005/0258769 A1 | 11/2005 | Imamura | | |

(Continued)

FOREIGN PATENT DOCUMENTS

| | | |
|---|---|---|
| KR | 10-2006-0047221 A | 5/2006 |
| KR | 10-2011-0024450 A | 3/2011 |

(Continued)

OTHER PUBLICATIONS

English Abstract for Korean Application No. KR 1020090128469, dated Dec. 21, 2009, for corresponding Korean Publication No. KR 10-2011-0071813 A, listed above, 2 pages.

(Continued)

*Primary Examiner* — Alesa Allgood
(74) *Attorney, Agent, or Firm* — Lewis Roca Rothgerber Christie LLP

(57) ABSTRACT

A display device includes a display unit including pixels in an area defined by a plurality of scan lines and a plurality of data lines, a scan driving unit configured to apply a plurality of scan signals to the scan lines, a data driving unit configured to apply a plurality of data signals to the data lines, an inspection circuit unit configured to apply a plurality of inspection signals to the data lines, a plurality of inspection pads configured to transmit a plurality of inspection control signals to the inspection circuit unit, a plurality of first inspection lines electrically connecting the inspection circuit unit to the inspection pads, and a plurality of second inspection lines branching off from the first inspection lines and electrically connecting the inspection circuit unit to the data driving unit.

9 Claims, 4 Drawing Sheets

(52) U.S. Cl.
CPC ............ G09G 3/2096 (2013.01); *G02F 2001/136254* (2013.01); *G09G 2300/0408* (2013.01); *G09G 2300/0426* (2013.01); *G09G 2320/0219* (2013.01); *G09G 2330/021* (2013.01)

(58) Field of Classification Search
USPC ............ 324/760.01, 750.3, 760.02, 403, 414,324/527, 750.05, 754.03, 762.01, 762.02,324/762.07, 522, 537, 750.16, 754.07, 756.01,324/762.03; 345/76, 82, 98; 313/504; 257/40
See application file for complete search history.

(56) References Cited

U.S. PATENT DOCUMENTS

| | | | |
|---|---|---|---|
| 2006/0125735 A1* | 6/2006 | Pae | G09G 3/3283 345/76 |
| 2007/0001711 A1* | 1/2007 | Kwak | G09G 3/006 324/762.07 |
| 2008/0068309 A1* | 3/2008 | Kwak | G09G 3/006 345/82 |
| 2011/0050660 A1 | 3/2011 | Kim et al. | |
| 2012/0327056 A1* | 12/2012 | Lee | G09G 3/006 345/211 |

FOREIGN PATENT DOCUMENTS

| | | |
|---|---|---|
| KR | 10-2011-0071813 A | 6/2011 |
| KR | 10-2012-0076900 A | 7/2012 |

OTHER PUBLICATIONS

English Abstract for Korean Application No. KR 1020100138666, dated Dec. 30, 2010, for corresponding Korean Publication No. KR 10-2012-0076900 A, listed above, 2 pages.

* cited by examiner

DISPLAY DEVICE

CROSS-REFERENCE TO RELATED APPLICATION

This application claims priority to and the benefit of Korean Patent Application No. 10-2014-0022072, filed on Feb. 25, 2014, with the Korean Intellectual Property Office, the disclosure of which is incorporated herein in its entirety by reference.

BACKGROUND

1. Field

Embodiments of the present invention relate to a display device capable of being used with a flexible printed circuit board having a reduced width mounted on a display substrate.

2. Description of the Related Art

In general, a display device includes a display substrate provided with a plurality of pixels in an area defined by a black matrix or a pixel defining layer. Display devices may be categorized into various types, including a liquid crystal display (LCD), a plasma display panel (PDP), an organic light emitting display (OLED), and the like which may depend on the type of the display substrate.

The display substrate generally has a quadrilateral shape and includes an active area configured to display an image and a non-display area at the edge of the active area. The active area includes a plurality of pixels provided in a pixel area defined by a plurality of scan lines and a plurality of data lines, and each pixel is driven by various signals and driving voltages transmitted over various signal lines and power lines provided in the non-display area.

The non-display area may include a plurality of pads for transmitting various signals and driving voltages supplied from the outside to each pixel, the various signal lines and power lines, and an inspection (or test) circuit unit for applying inspection (or test) signals to the pixels.

The plurality of pads may include driving pads and inspection (or test) pads. The driving pads transmit the various signals and driving voltages for driving the pixels to the active area. The inspection pads transmit inspection control signals to the inspection circuit unit in order to inspect (or test) the pixels.

After a pixel inspection is completed by the inspection circuit unit, a flexible printed circuit board such as a flexible print circuit (FPC), a chip on film (COF), a tape carrier package (TCP), and the like is mounted on the plurality of pads including the inspection pads. The various signals and driving voltages for driving each pixel are transmitted across the flexible printed circuit board, and then an off bias voltage for disabling the inspection circuit unit is supplied to the inspection pads.

Thus, the comparative flexible printed circuit board requires a space for a connecting circuit unit in order to apply the off bias voltage to the inspection circuit unit.

SUMMARY

Aspects of embodiments of the present invention are directed to a display device capable of reducing a space for a connecting circuit unit configured to apply an off bias voltage to an inspection circuit unit in a flexible printed circuit board.

According to an embodiment of the present invention, a display device includes: a display unit including pixels in an area defined by a plurality of scan lines and a plurality of data lines, a scan driving unit configured to apply a plurality of scan signals to the scan lines, a data driving unit configured to apply a plurality of data signals to the data lines, an inspection circuit unit configured to apply a plurality of inspection signals to the data lines, a plurality of inspection pads configured to transmit a plurality of inspection control signals to the inspection circuit unit, a plurality of first inspection lines electrically connecting the inspection circuit unit to the inspection pads, and a plurality of second inspection lines branching off from the first inspection lines and electrically connecting the inspection circuit unit to the data driving unit.

The data driving unit may apply an off bias voltage to the inspection circuit unit via the second inspection lines.

The off bias voltage may be one of a gate high-level voltage VGH and a gate low-level voltage VGL.

The inspection signals may include one of an emission inspection signal and an aging signal.

The display device may further include a plurality of power pads configured to transmit a scan driving power to the scan driving unit, a plurality of first power lines electrically connecting the scan driving unit to the power pads, and a plurality of second power lines branching off from the first power lines and electrically connecting the scan driving unit to the data driving unit.

The data driving unit may be configured to apply the scan driving power to the scan driving unit over the second power lines.

The scan driving power may include one of the gate high-level voltage VGH, the gate low-level voltage VGL, and an initiation voltage VINT.

The display device may further include a plurality of driving pads configured to transmit the data signals to the data driving unit and a flexible printed circuit board electrically connected to the driving pads.

The flexible printed circuit board may have a width smaller than the width of a display substrate.

The flexible printed circuit board may have a width practically the same as the width of the plurality of driving pads disposed on the display substrate.

According to some embodiments of the present invention, the connecting circuit unit for applying the off bias voltage to the inspection circuit unit is disposed in the display substrate, rather than disposed on the flexible printed circuit board as in a comparative display device, such that the size of the flexible printed circuit board mounted on the display substrate can be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present invention will be more clearly understood from the following detailed description taken in conjunction with the accompanying drawings, in which.

DETAILED DESCRIPTION

Figure 1:
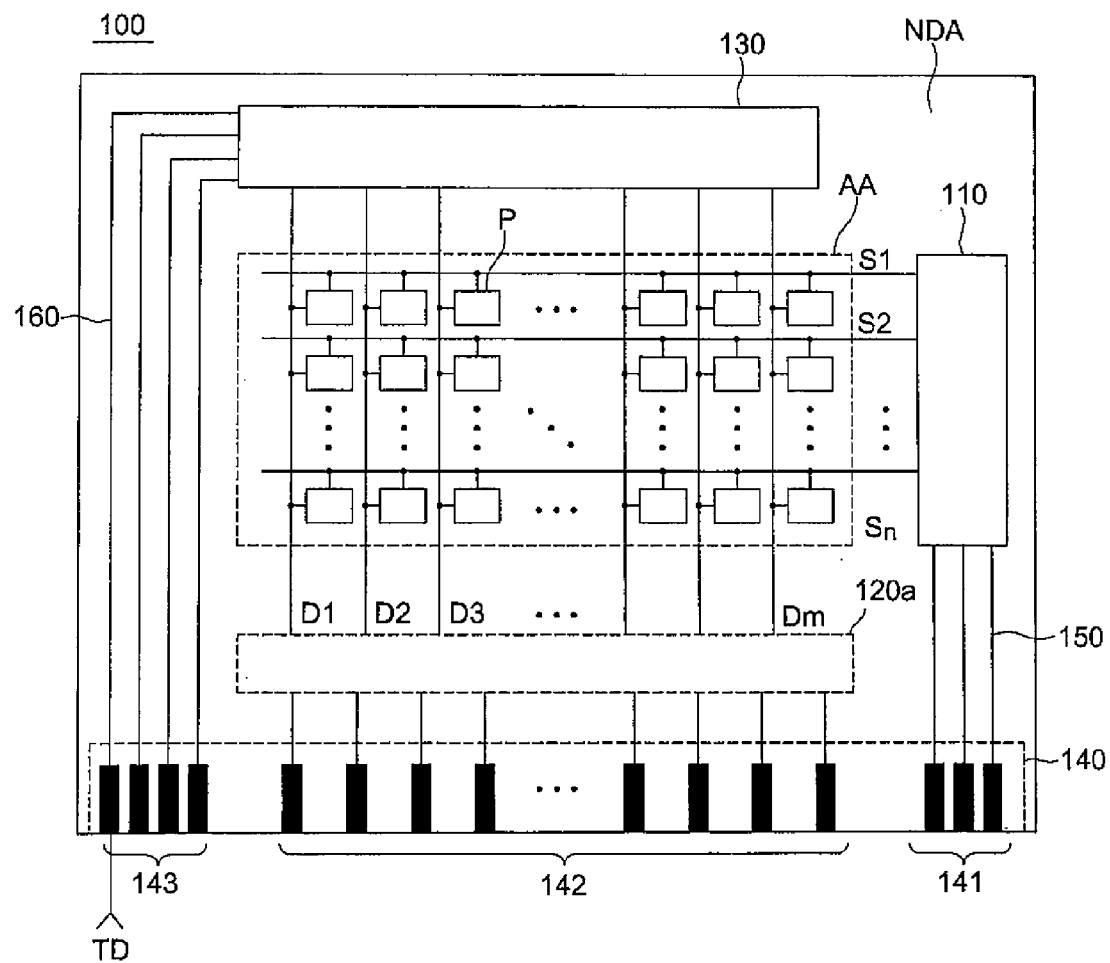
FIG. 1 is a schematic plan view showing a comparative display substrate.

Hereinafter, embodiments of the present invention will be described in more detail with reference to the accompanying drawings.

Although aspects of the present invention can be modified in various manners and have several embodiments, specific embodiments are illustrated in the accompanying drawings and will be mainly described in the specification. However, the scope of the embodiments of the present invention is not limited to the specific embodiments and should be construed as including all the changes, equivalents, and substitutions included in the spirit and scope of the present invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments of the present invention, and like reference numerals refer to like elements throughout the specification.

FIG. 1 is a schematic plan view showing a comparative display substrate.

Referring to FIG. 1, a comparative display substrate 10 has a quadrilateral shape and includes an active area AA for displaying an image and a non-display area NDA at the edge of the active area AA.

The active area AA includes pixels P provided in an area defined by a plurality of scan lines S1~Sn and a plurality of data lines D1~Dm. The scan lines S1~Sn are extended in (or extend along) a row direction and are almost (or substantially) parallel to one another, whereas the data lines D1~Dm and power lines P1~Pm are extended (or extend along) in a column direction and almost (or substantially) parallel to one another. The pixels P are driven by various signals and driving voltages transmitted over various signal lines and power lines provided in the non-display area NDA.

The non-display area NDA includes a scan driving unit 110, a data driving unit mounting area 120a, an inspection (or test) circuit unit 130, and a pad unit 140.

The pad unit 140 may include a power pad unit 141 transmitting a scan driving power and scan control signals supplied from the outside (for example, from an external source via a flexible printed circuit board), a driving pad unit 142 transmitting data signals supplied from the outside to a data driving unit 120, and an inspection (or test) pad unit 143 transmitting inspection (or test) control signals TD supplied from the outside to the inspection circuit unit 130.

In addition, the inspection pad unit 143 can transmit an off bias voltage to the inspection circuit unit 130 after a pixel inspection described below is completed.

The scan driving unit 110 generates scan signals in accordance with the scan driving power and the scan control signals applied across the power pad unit 141, and sequentially transmits the scan signals to the plurality of scan lines S1~Sn. The power pad unit 141 and the scan driving unit 110 may be connected by a plurality of power lines 150.

The data driving unit mounting area 120a is formed to accommodate a data driving unit 120 described in more detail below. The data driving unit 120 sequentially transmits the data signals applied from the outside to the plurality of data lines D1~Dm across the driving pad unit 142. The data driving unit 120 may be provided in a form of an integrated circuit IC chip on the data driving unit mounting area 120a after the pixel inspection described below is completed.

The inspection circuit unit 130 is connected to the data lines D1~Dm, and is configured to generate inspection signals in accordance with the inspection control signals TD supplied from the outside across the inspection pad unit 143 and to transmit the inspection signals to the data lines D1~Dm. The inspection control signals TD supplied from the outside include emission inspection control signals and aging control signals.

The inspection circuit unit 130 and the inspection pad unit 143 may be connected by a plurality of inspection (or test) lines 160. The inspection circuit unit 130 includes a plurality of transistors between the inspection lines 160 and the data lines D1~Dm. The inspection circuit unit 130 may perform the pixel inspection before the data driver integrated circuit and the flexible printed circuit board are mounted on the display substrate 100. Accordingly, defective display substrates can be detected beforehand (e.g., before completing assembly of the entire display device), and thus unnecessary consumption of materials can be prevented or reduced.

The inspection circuit unit 130 can be (or is typically) disabled during actual (or normal) driving operations after the inspection (or test) is completed. Therefore, the off bias voltage is applied to the inspection circuit unit 130 during the actual driving.

In FIG. 1, the inspection circuit unit 130 is depicted as being disposed in the upper portion of the active area AA, however, embodiments of the present invention are not limited thereto, and thus the inspection circuit unit 130 may be located elsewhere in the display substrate 100.

Figure 2:
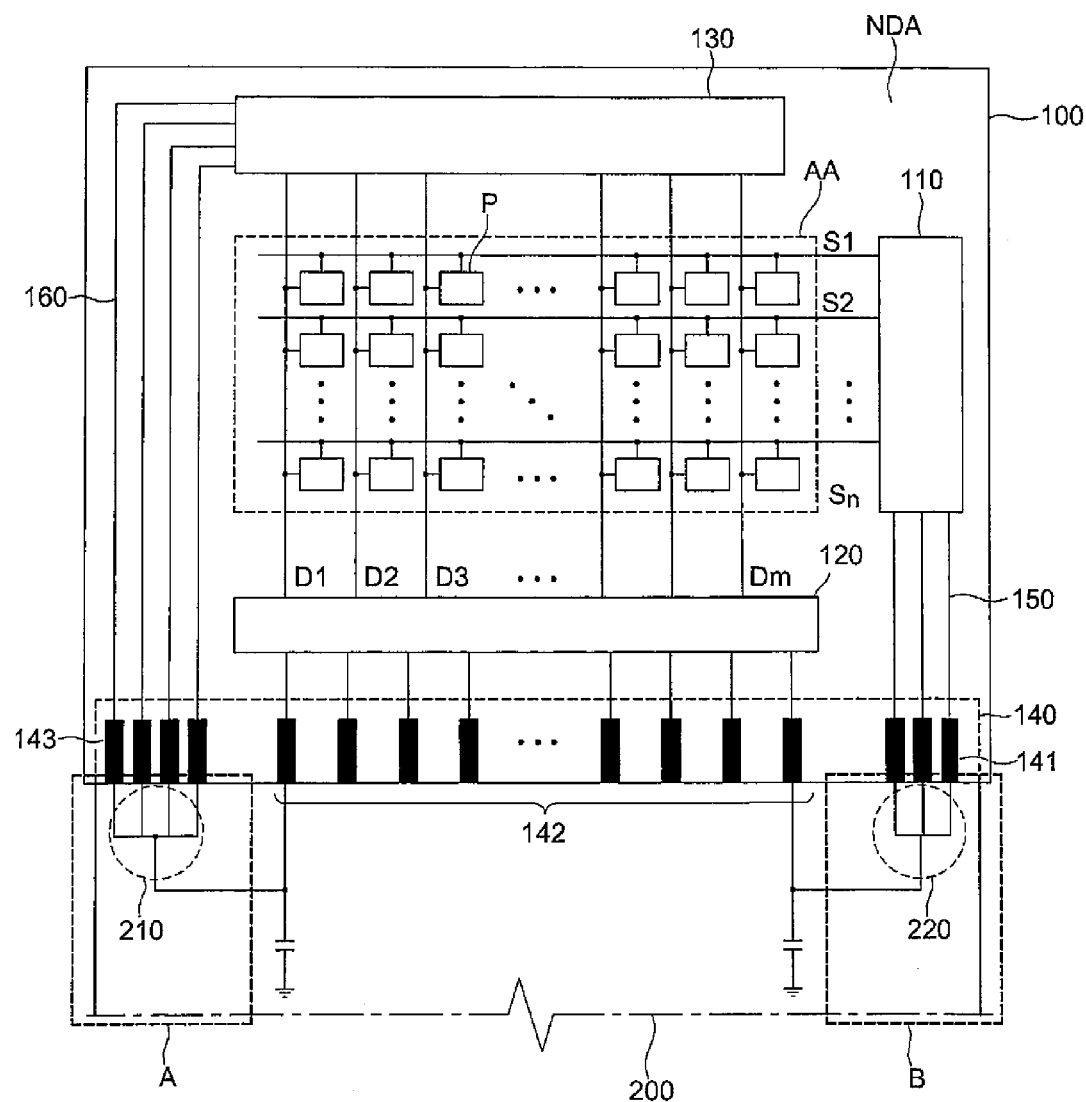
FIG. 2 is a schematic plan view showing a data integrated circuit and a flexible printed circuit board mounted on the comparative display substrate.

FIG. 2 is a schematic plan view showing the data driver integrated circuit 120 and the flexible printed circuit board 200 mounted on the comparative display substrate.

In more detail, FIG. 2 is a schematic plan view illustrating a state where the data driver integrated circuit (or data driving unit) 120 and the flexible printed circuit board 200 are mounted on the display substrate 100, after the pixel inspection is completed by the inspection circuit unit 130.

Types of flexible printed circuit boards 200 include flexible print circuit (FPC), the chip on film (COF), the tape carrier package (TCP), and the like.

Referring to FIGS. 1 and 2, the flexible printed circuit board 200 is connected to the pad unit 140, and applies the various signals and driving voltages for driving each pixel to the display substrate 100.

In more detail, the flexible printed circuit board 200 applies the scan driving power and the scan control signals to the power pad unit 141, applies the data signals to the driving pad unit 142, and further applies the off bias voltage to the inspection pad unit 143.

The inspection circuit unit 130 plays a role only during a pixel inspection (or test) and is disabled during an actual (or normal) driving, and therefore the off bias voltage is supplied to the inspection circuit unit 130 across the inspection pad unit 143 after the pixel inspection is completed.

The off bias voltage applied to the inspection pad unit 143 may be determined depending on the type of thin-film transistors composing the inspection circuit unit 130.

For example, in a case where the inspection circuit unit 130 is composed of PMOS thin-film transistors, a gate high-level voltage VGH is applied to the inspection pad unit 143 in order to apply the off bias voltage to the PMOS thin-film transistors.

Likewise, in a case where the inspection circuit unit 130 is composed of NMOS thin-film transistors, a gate low-level voltage VGL is applied to the inspection pad unit 143 in order to apply the off bias voltage to the NMOS thin-film transistors.

Meanwhile, a connecting circuit unit (or first connecting circuit unit) 210 may be disposed on the flexible printed circuit board 200 in an area A connected to the inspection pad unit 143 in order to apply the off bias voltage. Hereinafter, the area A refers to the allocated area for accommodating the connecting circuit unit 210 on the flexible printed circuit board 200.

Likewise, a connecting circuit unit (or second connecting circuit unit) 220 may be disposed on the flexible printed circuit board 200 in an area B connected to the power pad unit 141 in order to apply the scan driving power and the scan control signals. Hereinafter, the area B refers to the allocated area for accommodating the connecting circuit unit 220 on the flexible printed circuit board 200.

Embodiments of the present invention provides a display device in which the connecting circuit unit 210 for applying the off bias voltage to the inspection circuit unit 130 or the connecting circuit unit 220 for applying the scan driving power to the scan driving unit 110 are disposed in the display substrate 100, such that the A area or the B area on the flexible printed circuit board 200 can be reduced.

Figure 3:
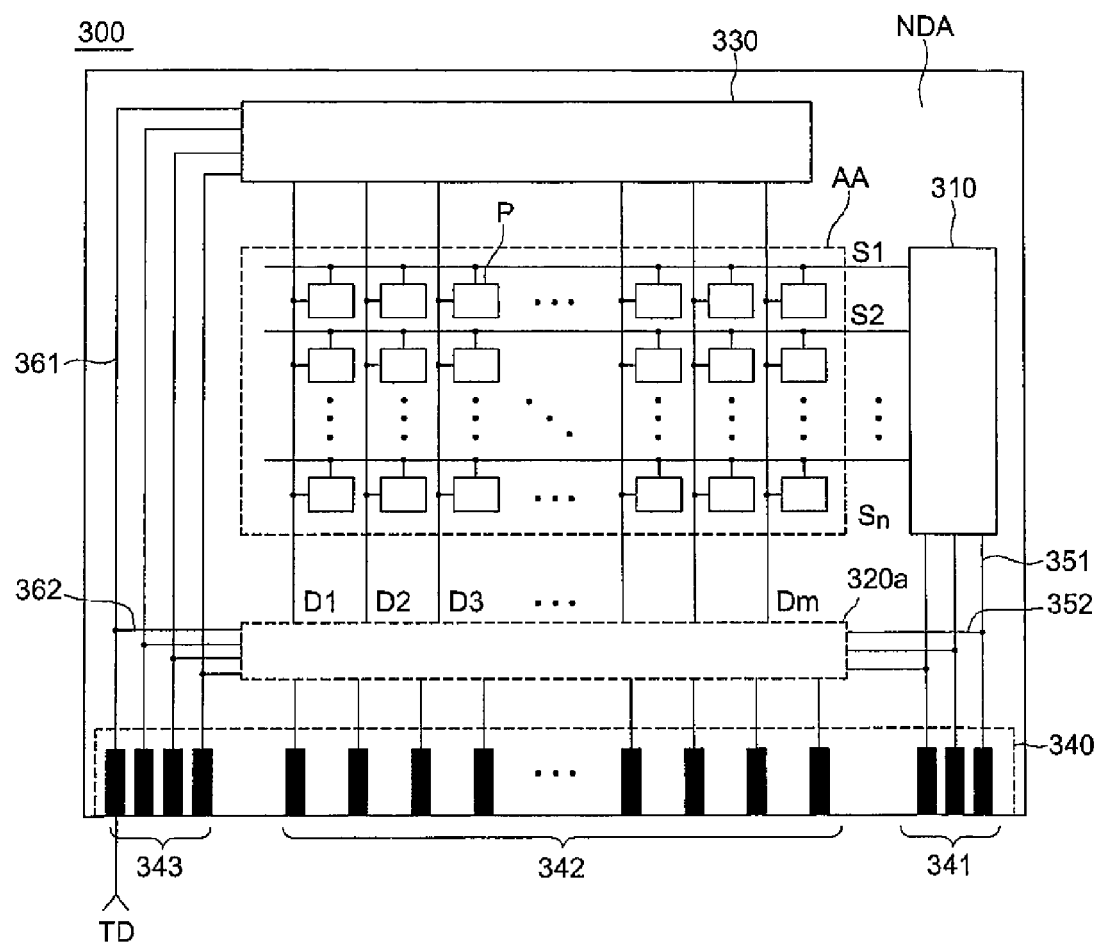
FIG. 3 is a schematic plan view showing a display substrate according to an embodiment of the present invention.

FIG. 3 is a schematic plan view showing a display substrate according to an embodiment of the present invention.

Repeated descriptions of components substantially similar to that of the comparative display substrate will not be provided below for the description of an embodiment of the present invention.

Referring to FIG. 3, a display substrate 300 according to an embodiment of the present invention includes the active area AA for displaying an image and the non-display area NDA at the edge of the active area AA.

The active area AA includes the plurality of pixels P in an area defined by the plurality of scan lines S1~Sn and the plurality of data lines D1~Dm.

The non-display area NDA includes a scan driving unit 310, a data driving unit mounting area 320*a*, an inspection (or test) circuit unit 330, and a pad unit 340.

The pad unit 340 may include a power pad unit 341 transmitting the scan driving power and the scan control signals supplied from the outside (for example, the flexible printed circuit board) to the scan driving unit 310, a driving pad unit 342 transmitting the data signals supplied from the outside to the data driving unit 320, and an inspection (or test) pad unit 343 transmitting the inspection (or test) control signals TD supplied from the outside to the inspection circuit unit 330.

The flexible printed circuit board described below may be further mounted on the driving pad unit 342. The width of the flexible printed circuit board mounted on the driving pad unit 342 may be smaller than the width of the display substrate 300. Further, the flexible printed circuit board mounted on the driving pad unit 342 may have substantially the same width as the driving pad unit 343 disposed on the display substrate 300.

According to an embodiment of the present invention, the display substrate 300 may include a plurality of first inspection lines 361 connecting the inspection circuit unit 330 and the inspection pad unit 343, and a plurality of second inspection lines 362 branching off from the plurality of first inspection lines 361 and extended to the data driving unit mounting area 320*a*.

When a data driving unit described below is mounted on the data driving unit mounting area 320*a*, the inspection circuit unit 330 and the data driving unit can be connected by the plurality of second inspection lines 362. In this case, the data driving unit applies the off bias voltage to the inspection circuit unit 330.

The off bias voltage applied from the data driving unit may be determined depending on the type of thin-film transistors composing the inspection circuit unit 330.

For example, in a case where the inspection circuit unit 330 is composed of the PMOS thin-film transistors, the data driving unit may apply the gate high-level voltage as the off bias voltage.

Likewise, in a case where the inspection circuit unit 330 is composed of the NMOS thin-film transistors, the data driving unit may apply the gate low-level voltage VGL as the off bias voltage.

Thus, the inspection control signals TD are supplied to the inspection circuit unit 330 from the outside before the data driving unit is mounted on the data driving unit mounting area 320*a*, and the off bias voltage is applied from the data driving unit to the inspection circuit unit 330 after the data driving unit is mounted thereon.

In other words, in the comparative display device, the connecting circuit unit on the flexible printed circuit board played a role in applying the off bias voltage to the inspection circuit unit, whereas the data driving unit in the display substrate in an embodiment of the present invention plays a role in applying the off bias voltage.

Therefore, according to an embodiment of the present invention, a flexible printed circuit board area (the area A, refer to FIG. 2) for accommodating the connecting circuit unit applying the off bias voltage to the inspection circuit unit in the comparative display device is not required, such that the corresponding area (the area A, refer to FIG. 2) of the flexible printed circuit board can be reduced.

In addition, the above-describe principle for reducing the area for accommodating the inspection circuit unit 330 can be also applied to the scan driving unit 310.

According to an embodiment of the present invention, the display substrate 300 may include a plurality of first power lines 351 connecting the scan driving unit 310 to the power pad unit 341, and a plurality of second power lines 352 branching off from the plurality of first power lines 351 and extending to the data driving unit mounting area 320*a*.

When a data driving unit described in more detail below is mounted on the data driving unit mounting area 320*a*, the scan driving unit 310 and the data driving unit can be connected by the plurality of second power lines 352. In this case, the data driving unit applies the scan driving power to the scan driving unit 310.

The scan driving power applied from the data driving unit may be one of or may include the gate high-level voltage VGH, the gate low-level voltage VGL, and the initiation voltage VINT.

In other words, in the comparative display device, the connecting circuit unit on the flexible printed circuit board played a role in applying the scan driving power to the scan driving unit, whereas the data driving unit in the display substrate in an embodiment of the present invention plays the role of applying the scan driving power to the scan driving unit.

Therefore, according to an embodiment of the present invention, a flexible printed circuit board area (the area B, refer to FIG. 2) for accommodating the connecting circuit unit for applying the scan driving power to the inspection pad unit in a comparative display device is not required, such that the corresponding area (the area B, refer to FIG. 2) of the flexible printed circuit board can be reduced.

Figure 4:
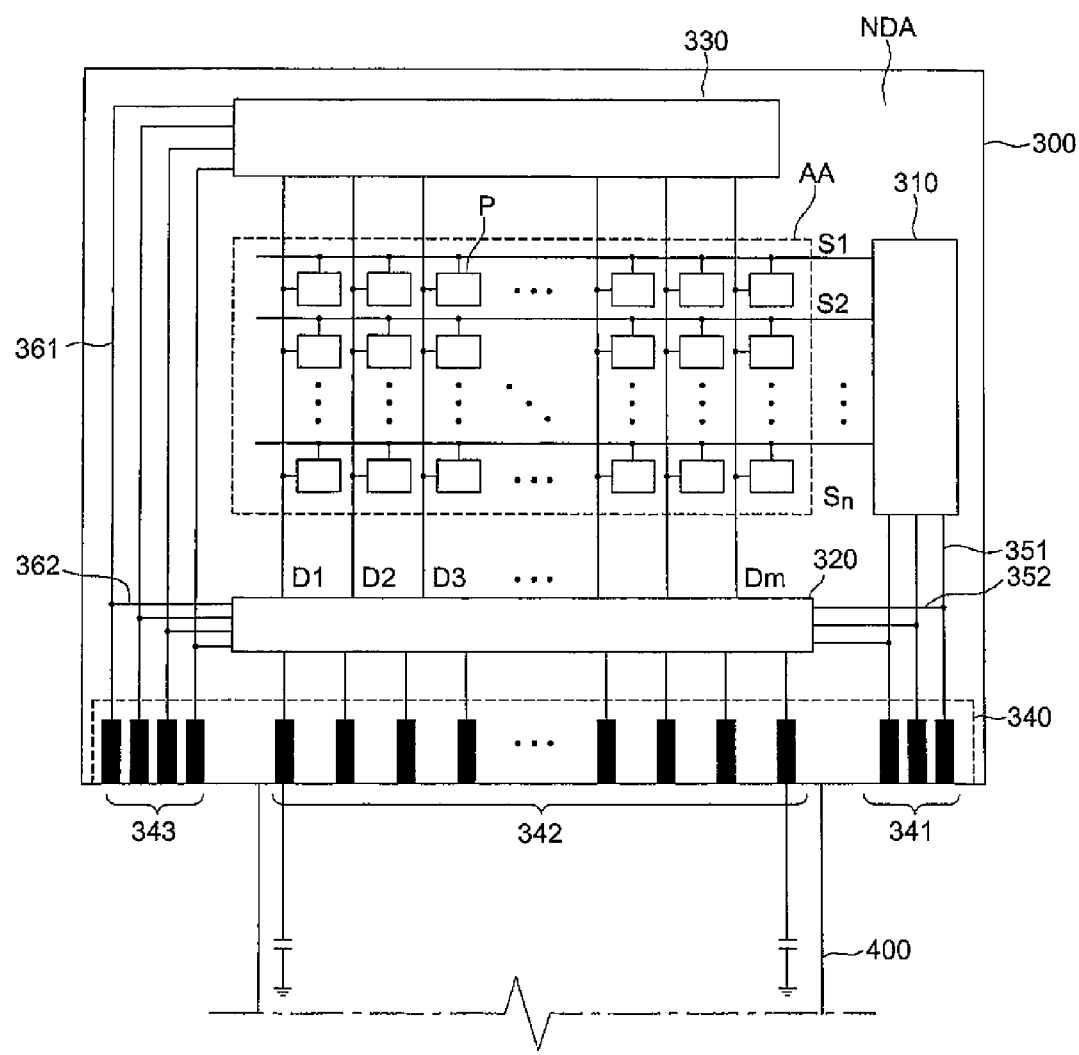
FIG. 4 is a schematic plan view showing the data integrated circuit and the flexible printed circuit board mounted on the display substrate according to an embodiment of the present invention.

FIG. 4 is a schematic plan view showing the data driver integrated circuit and the flexible printed circuit board mounted on the display substrate according to an embodiment of the present invention.

In more detail, FIG. 4 is a schematic plan view illustrating a state where the data driver integrated circuit 320 and the flexible printed circuit board 400 are mounted on the display substrate 300, after the pixel inspection is completed by the inspection circuit unit 330.

The types of the flexible printed circuit board 400 include the flexible print circuit (FPC), the chip on film (COF), the tape carrier package (TCP), and the like.

Referring to FIG. 4, the flexible printed circuit board 400 applies the various signals and driving voltages for driving each pixel P to the driving pad unit 342.

The flexible printed circuit board 400 may be mounted on the driving pad unit 342. The width of the flexible printed circuit board 400 mounted on the driving pad unit 342 may be smaller than the width of the display substrate 300 (e.g., smaller than the width of the side of the display substrate in which the pad unit 340 is located). Further, the width of the flexible printed circuit board 400 mounted on the driving pad unit 342 may be practically the same as the width of the driving pad unit 343 disposed on the display substrate 300.

The data driver integrated circuit 320 applies the off bias voltage to the inspection circuit unit 330 over the second inspection lines 362. Further, the data driver integrated circuit 320 may apply the scan driving power to the scan driving unit 310 over the second power lines 352.

According to an embodiment of the present invention, the flexible printed circuit board areas (the areas A and B, refer to FIG. 2) for accommodating the connecting circuit units configured to apply the off bias voltage to the inspection pad unit 343 or to apply the scan driving power to the power pad unit 341 in the comparative display device are not required, such that the widths of the flexible printed circuit boards can be reduced in comparison to the comparative display device.

As a result, according to an embodiment of the present invention, a flexible printed circuit board area connected only to the driving pad unit 342 (e.g., and not the power pad unit 341 and not the inspection pad unit 343) is capable of operating the display device by applying the data signals to the data driving unit, and therefore the flexible printed circuit board can have a width smaller than the width of the comparative flexible printed circuit board.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims and equivalents thereof.

What is claimed is:

1. A display device comprising:
a display unit including pixels in an area defined by a plurality of scan lines and a plurality of data lines;
a scan driving unit configured to apply a plurality of scan signals to the scan lines;
a data driving unit configured to apply a plurality of data signals to the data lines;
an inspection circuit unit configured to apply a plurality of inspection signals to the data lines;
a plurality of inspection pads configured to transmit a plurality of inspection control signals to the inspection circuit unit;
a plurality of first inspection lines electrically connecting the inspection circuit unit to the inspection pads; and
a plurality of second inspection lines branching off from the first inspection lines and electrically connecting the inspection circuit unit to the data driving unit;
wherein the data driving unit applies an off bias voltage to the inspection circuit unit via the second inspection lines.

2. The display device of claim 1, wherein the off bias voltage is one of a gate high-level voltage VGH and a gate low-level voltage VGL.

3. The display device of claim 1, wherein the inspection signals comprise one of an emission inspection signal and an aging signal.

4. The display device of claim 1, wherein the inspection circuit unit is physically separate from the data driving unit, and wherein the inspection circuit unit is coupled directly to the data lines.

5. The display device of claim 1, wherein the display device further comprises:
a plurality of driving pads configured to transmit the data signals to the data driving unit; and
a flexible printed circuit board electrically connected to the driving pads.

6. The display device of claim 5, wherein the flexible printed circuit board has a width smaller than the width of a display substrate.

7. The display device of claim 5, wherein the flexible printed circuit board has substantially the same width as the plurality of driving pads disposed on the display substrate.

8. A display device comprising:
a display unit including pixels in an area defined by a plurality of scan lines and a plurality of data lines;
a scan driving unit configured to apply a plurality of scan signals to the scan lines;
a data driving unit configured to apply a plurality of data signals to the data lines;
an inspection circuit unit configured to apply a plurality of inspection signals to the data lines;
a plurality of inspection pads configured to transmit a plurality of inspection control signals to the inspection circuit unit;
a plurality of first inspection lines electrically connecting the inspection circuit unit to the inspection pads;

a plurality of second inspection lines branching off from the first inspection lines and electrically connecting the inspection circuit unit to the data driving unit;

a plurality of power pads configured to transmit a scan driving power to the scan driving unit;

a plurality of first power lines electrically connecting the scan driving unit to the power pads; and a plurality of second power lines branching off from the first power lines and electrically connecting the scan driving unit to the data driving unit;

wherein the data driving unit is configured to apply the scan driving power to the scan driving unit via the second power lines.

9. The display device of claim 8, wherein the scan driving power comprises one of the gate high-level voltage VGH, the gate low-level voltage VGL, and an initiation voltage VINT.

* * * * *